United States Patent

[11] 3,563,294

| [72] | Inventor | Alex Chien |
| | | 345 W. Third St., Long Beach, Calif. 90812 |
| [21] | Appl. No. | 742,041 |
| [22] | Filed | July 2, 1968 |
| [45] | Patented | Feb. 16, 1971 |

[54] PUNCTURE-SEALING BAND
4 Claims, 6 Drawing Figs.

[52] U.S. Cl. ................................................. 152/346
[51] Int. Cl. ........................................... B60c 17/00
[50] Field of Search ........................................... 152/346, 347, 348, 349

[56] References Cited
UNITED STATES PATENTS

| 1,874,197 | 8/1932 | Lang | 152/346 |
| 1,977,281 | 10/1934 | Knowlton | 152/346 |
| 2,550,773 | 5/1951 | Christensen et al. | 152/346 |
| 2,877,819 | 3/1959 | Gibbs | 152/347 |
| 3,444,918 | 5/1969 | Goggins | 152/347 |

Primary Examiner—James B. Marbert

ABSTRACT: This disclosure describes an inner, protective flexible linear or band which is positioned adjacent the inner radial wall of a pneumatic tire, said linear having a plurality of structural blocks sandwiched therebetween, said plyable sheets along with block structures form fluid retaining pockets whereby a self-sealing fluid composition is encased therein, said fluid being released to fill an aperture formed by a puncture to the pressurized tire.

PATENTED FEB 16 1971

3,563,294

INVENTOR,
Alex Chien.

PUNCTURE-SEALING BAND

The invention relates to a safety device which is to be used in all kinds of tires for purpose of the puncture sealing.

This invention aims to provide a complete coverage of sealant material, flowable to heal any wound from a nail puncture, and effectively sealing such puncture in a pneumatic tire from a possible air leakage.

A principal object is to use an annular band, comprising synthetic rubber composition and effective sealant material, and having means to restrain the said flowable sealant, with a number of solid rubber diamonds, alternatively arranged and bonded to its rubber sheet casing.

Another object is to provide the liquid sealant, flowable to heal any wound, whenever a puncture occurred, thus releasing the air pressure to draw the flow, and on the other hand is to restrain the said flowable sealant, preparing for an even balancing to the centrifugal force or the constant rotation of a tire.

Another object is to incorporate the said band directly into a tire or on the circumferential area of a pneumatic tube.

The first conception was to make a delicate rubber framework in the said band, but the inflation and rotation of the tire had deformed the whole feeble honeycomb structure. The next was to improve the said structure by making it bigger and stronger, but either its space or its strength failed to offer a total coverage for providing the required sealant.

The present conception is to use big and strong rubber diamonds as both foundation and cubical framework as a restraining means to still the liquid sealant flowable in each of its respective diamond shaped cubicles, whereas to prevent the sealant from gathering in the fore and aft part of the diamond which has pointed and narrow area, but to retain it in the central diagonal area, thus establishing an equal distribution of the sealant, and an even balancing of the tire while under the influence of its constant rotation.

Because of its simplicity in design, a handmade model has been used for its experimentation. It is comprised of a rubber band, in the form of an annular ring, at a diameter of 26 inches, a crown of 1¼inches, a width of 7¼inches, and a thickness of ½inches. There are 80 rows of solid rubber diamonds, each being ¾ inches × ¾ inches × 3/16 inches, and 7 rows in width with a tapered sticky edge of ⅛ inches on each side. Half of the said diamonds are applied and bonded to the bottom side of the top rubber sheet, 1/16 inches in thickness, and the other half to the top side of the bottom rubber sheet which material is to use vulcanized rubber of low viscosity and high heat resistance. The said diamonds are alternatively arranged in such a design as forming a positive pattern (FIG. 5), a negative pattern (FIG. 6), and a double-up pattern (FIG. 3). The combination of these three patterns is to establish a complete and unique coverage and operation for both vacant diamonds which filled with said sealant material, and solid rubber diamonds which bonded to the rubber sheet casing, extending in parallel and covering all around continuously with no gap between these diamonds, to perform the said band in its operations features, and its feasibility to restrain and to provide the flowable sealant effectively and simultaneously.

Figure 1:
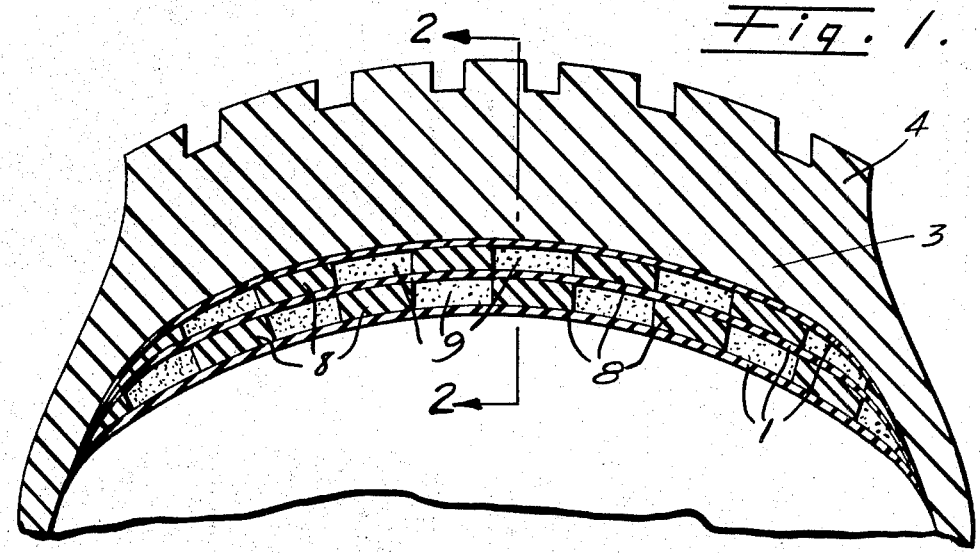
FIG. 1 is a cross-sectional view of the upper part of a tire, showing the front of the puncture-sealing band.
Figure 2:
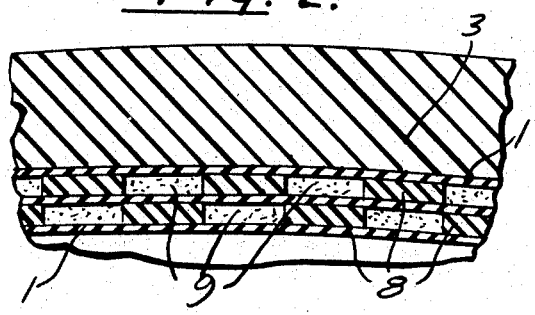
FIG. 2 is a side sectional view of the tire taken on the line 2–2 of FIG. 1, showing an arc of the said band.

FIGS. 1 and 2 shows the front and side view of the puncture-sealing band 1, installed in a tire as an individual device, extending in parallel all around the whole internal circumferential area of the carcass 3, right under the tire tread 4, having a greater width than the said tread, forming thus a complete coverage of the effective sealant for the purpose of puncture sealing.

Figure 3:
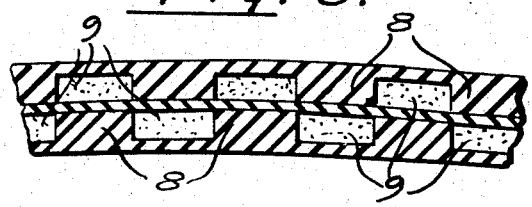
FIG. 3 is a partial sectional view of a different embodiment.

Referring to the FIG. 3 the said band, having two layers 5, and 6, doubled up in such a pattern, unshaded diamonds 9 over shaded diamonds 8, and vice versa, alternatingly and correspondingly, establishes the restraining means with the solid rubber diamonds 8 as both foundation and cubical framework, and with the flowable sealant material stilled and limited in the diamond shaped cubicles 9, each separated and independent of the other, thus equally and evenly distributed all over the band for the purpose of balancing the tire, thus prepared to withstand its constant rotation and inflation.

Figure 5:
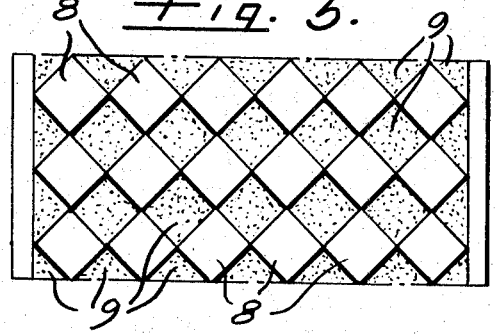
FIG. 5 is a plan sectional view of the top layer in the positive pattern showing the solid rubber diamonds in shaded diamonds, and the vacant diamonds that filled with the sealant in unshaded diamonds.
Figure 6:
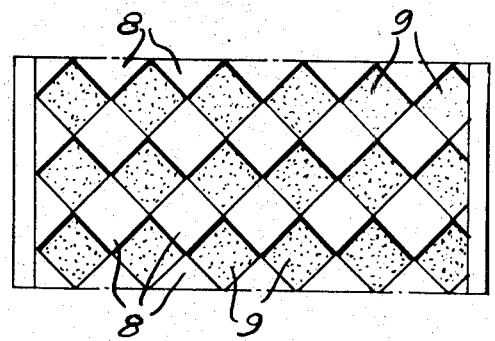
FIG. 6 is a similar view of the bottom layer in the negative pattern, showing each of these two kinds of diamonds in its alternative and relative position.
Figure 4:
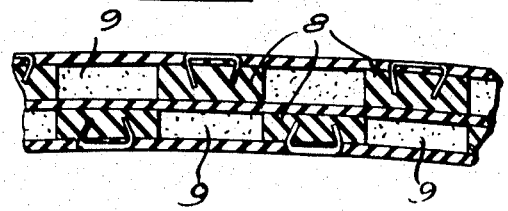
FIG. 4 is a partial sectional view of still another embodiment of my invention.

Referring to the FIGS. 4, 5, 6, and 7 the said band has two layers of rubber composition, one in positive pattern FIG. 5, and the other in negative pattern FIG. 6, each showing only a section of 3 rows of diamonds and a whole of 7 rows in width with a tapered rubber edge 10 of ⅛ inches on each side, and has two rubber sheets FIGS. 4 and 7 to which bottom and top side are bonded these two layers of solid diamonds respectively as 4, 5, 6, 7 in FIG. 3.

In the foregoing paragraphs. I have described the preferable embodiment of my invention, and yet there could be other modifications such as using triangle shaped cubicles or others, using one or more layers of any chemical compositions instead of only two layers doubled up, incorporating wholly or partly the said band directly into a tire of on a tube, instead of being as an individual device, and using other innovations within the scope of this invention as defined in the claims.

I claim:

1. A flexible band positioned within a pneumatic tire and adjacent the inner radial wall thereof, having in combination and comprising:

a plurality of annular flexible sheets;

a plurality of block structures attaches to and sandwiched between said sheets, said blocks being contiguously arranged so as to form a multiplicity of pockets therebetween; and a fluid sealant material interposed within said pockets and wherein said sealant material may flow into an aperture produced by a puncture in said pressurized tire.

2. A flexible, annular linear positioned within a pneumatic tire and adjacent the inner wall thereof, having in combination and comprising:

a first outer radial stretchable band, one face thereof being in radial contact with said inner wall of said tire;

a first layer of contiguously arranged blocks secured to the opposite face of said first radial band, said blocks having outer walls defining pockets therein;

a second flexible sheet secured to the under side of said blocks and thereby defining a multiplicity of voids formed by the walls of the sandwiched-between said first and second flexible sheets;

a second layer of contiguously arranged blocks secured to the opposite side of said second flexible sheet, said second layer of blocks being offset from said first layer, so that each block of said second layer is positioned under each void;

a third flexible sheet secured to the under side of said second layer of blocks forming a multiplicity of enclosed voids, each of said voids being positioned under each of said blocks of said first layer; and a fluid sealant material disposed within each of said voids, whereby apertures made in said tires by punctures may be filled.

3. A flexible, annular linear as recited in claim 2 wherein said blocks are formed of solid rubber.

4. A flexible, annular linear as recited in claim 3 wherein said blocks are box shaped, and wherein said walls of one layer of blocks overlap the walls of said other layer of blocks.